United States Patent
Chen et al.

(10) Patent No.: US 9,545,592 B2
(45) Date of Patent: Jan. 17, 2017

(54) PROTECTION DEVICE FOR AIR FILTER

(71) Applicant: AIR-SYS REFRIGERATION ENGINEERING TECHNOLOGY (BEIJING) CO., LTD., Beijing (CN)

(72) Inventors: Yunshui Chen, Beijing (CN); Xiaolong Yang, Beijing (CN); Bo Wu, Beijing (CN)

(73) Assignee: AIR-SYS REFRIGERATION ENGINEERING TECHNOLOGY (BEIJING) CO., LTD, Beijing (CN)

( * ) Notice: Subject to any disclaimer, the term of this patent is extended or adjusted under 35 U.S.C. 154(b) by 0 days.

(21) Appl. No.: 14/950,592

(22) Filed: Nov. 24, 2015

(65) Prior Publication Data

US 2016/0144309 A1 May 26, 2016

(30) Foreign Application Priority Data

Nov. 25, 2014 (CN) .......................... 2014 1 0690431
Dec. 8, 2014 (CN) .......................... 2014 1 0743815

(51) Int. Cl.
*B01D 46/00* (2006.01)
*B01D 46/44* (2006.01)

(52) U.S. Cl.
CPC ......... *B01D 46/0086* (2013.01); *B01D 46/442* (2013.01)

(58) Field of Classification Search
CPC ..................... B01D 46/0086; B01D 46/442
See application file for complete search history.

(56) References Cited

U.S. PATENT DOCUMENTS

| | | | | |
|---|---|---|---|---|
| 3,646,423 A | * | 2/1972 | Tatematsu ............. | H02M 7/066 315/240 |
| 4,352,000 A | * | 9/1982 | Fujishima ............. | H05B 6/062 219/626 |
| 4,455,820 A | * | 6/1984 | Buckley, Jr. ............. | F02C 9/28 60/39.281 |

(Continued)

FOREIGN PATENT DOCUMENTS

| CN | 1075553 A | 8/1993 |
|---|---|---|
| JP | 2001-062230 A | 3/2001 |

OTHER PUBLICATIONS

Sep. 6, 2015 Office Action issued in Chinese Patent Application No. 201410743815.9.

*Primary Examiner* — Amber R Orlando
*Assistant Examiner* — Britanny Precht
(74) *Attorney, Agent, or Firm* — Oliff PLC

(57) ABSTRACT

The present invention provides a protection device for air filter, which includes a dust sensor and an air filter protector, wherein, the air filter protector includes: a dust concentration comparator adapted for comparing a level signal transmitted by the dust sensor to represent a particle concentration of dust or smoke with a reference level, so as to output a positive or negative pulse signal according to a result of the comparison; a first inverter; a pulse generator and adapted for inverting a pulse signal outputted by the first inverter; a filtering comparator adapted for converting an output of the pulse generator into a high or low level signal; a relay switch adapted for performing on or off action according to the output of the filtering comparator, so as to control opening and closing of an air valve of the air filter.

4 Claims, 4 Drawing Sheets

(56) References Cited

U.S. PATENT DOCUMENTS

| | | | | |
|---|---|---|---|---|
| 5,793,623 | A | * | 8/1998 | Kawashima ........ H02M 1/4225 363/36 |
| 2013/0036804 | A1 | * | 2/2013 | Uehara .............. B01D 46/0086 73/114.31 |
| 2016/0048143 | A1 | * | 2/2016 | Chan .................... F24F 11/0012 700/276 |

* cited by examiner

PROTECTION DEVICE FOR AIR FILTER

CROSS-REFERENCE TO RELATED APPLICATIONS

Pursuant to 35 U.S.C. §119 and the Paris Convention, this application claims the benefit of Chinese Patent Application No. 201410690431.5 filed Nov. 25, 2014 and Chinese Patent Application No. 201410743815.9 filed Dec. 8, 2014, the contents of which are incorporated herein by reference.

TECHNICAL FIELD

The present invention relates to the technical field of automatic control, and in particular relates to a protection device for air filter.

BACKGROUND

The main function of HVAC (Heating, Ventilating and Air Conditioning) includes heating, filtering ventilation and temperature adjustment, which respectively correspond to a heater, an air filter and a temperature regulator.

Wherein, the air filter serves a purpose of reducing moisture, stink, smoke dust, bacteria and carbon dioxide within an area as well as supplement oxygen. The ventilation includes air circulation within a building to avoid indoor gas holdup, which is an important factor for keeping the quality of indoor air.

Air filters of HVAC in prior art basically are based on manual control by users, or based on secondary development of inspection data through programs by "third party" chips or devices so as to carry out operation. However, when using manual control, because the user cannot get hold of the exact information of air contamination, the accuracy of the manual control cannot be guaranteed. When performing secondary development of inspection data through programs by "third party" chips or devices, the cost is increased, and the programs based on "third party" chips or devices might lead to poor compatibility, which damages the service life of the air filter or causes control failure.

SUMMARY

One objective of the present application is to provide a protection device for air filter which uses low cost circuit to convert a voltage signal output of a dust sensor into a switching value signal so as to control the air filter and protect its normal operation.

The protection device for air filter comprises a dust sensor and an air filter protector connected with the dust sensor, wherein, the air filter protector comprises:

a dust concentration comparator connected to the dust sensor and adapted for comparing a level signal transmitted by the dust sensor to represent a particle concentration of dust or smoke with a reference level, so as to output a positive or negative pulse signal according to
  a result of the comparison;
  a first inverter connected to the dust concentration comparator;
  a pulse generator connected to the first inverter and adapted for inverting a pulse signal outputted by the first inverter;
  a filtering comparator connected to the pulse generator and adapted for converting an output of the pulse generator into a high or low level signal;
  a relay switch connected to the filtering comparator and adapted for performing on or off action according to the output of the filtering comparator, so as to control opening and closing of an air valve of the air filter.

Thus, by using low cost circuit to convert a voltage signal output of the dust sensor into a switching value signal, the air filter is controlled to protect its normal operation.

In a class of embodiment, the protection device further comprises a level adjusting circuit connected to the dust concentration comparator and adapted for adjusting a value of the reference level.

In a class of embodiment, the level adjusting circuit comprises:

a first resistor with a sliding end connected to a reference level receiving end of the dust concentration comparator and with a fixed end connected to ground;

a second resistor with a sliding end coupled to the sliding end of the first resistor through a diode and with a fixed end coupled to an output end of the filtering comparator through a second inverter.

Thus, the first resistor is arranged to adjust the value of the reference level, and the second resistor is arranged to adjust the jump range of the value of the reference level so as to effectively avoid frequent jump of the output level of the dust concentration comparator caused by minor changes of the particle concentration of dust or smoke.

In a class of embodiment, the protection device further comprises a power unit having an LM7805 chip which is connected to the aforementioned components of the protection device respectively for supplying power to the components.

In a class of embodiment, the dust concentration comparator, the first inverter and the filtering comparator respectively comprises an LM324 chip.

In a class of embodiment, the pulse generator comprises an NE555 chip.

BRIEF DESCRIPTION OF THE DRAWINGS

In order to make the present invention easier to be clearly understood, the invention will be described in detail with reference to the embodiments and the drawings, wherein.

DETAILED DESCRIPTION OF EMBODIMENTS

Figure 1:
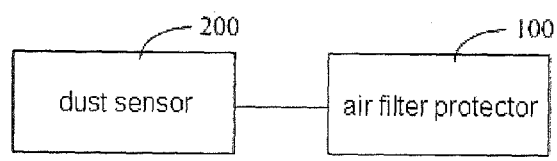
FIG. 1 is a schematic diagram of the protection device for air filter.

As shown in FIG. 1, a protection device for air filter comprises a dust sensor 200 and an air filter protector 100 connected with the dust sensor 200. The dust sensor 200 is configured to detect a particle concentration of dust or smoke indoors, and the air filter protector 100 is configured to control opening and closing of an air filter connected thereto, based on the detection result. The advantage of the present invention lies in that, a voltage signal output of the dust sensor 200 is converted into a switching value signal that controls the air filter, so that the protection of the air filter is achieved by circuits, new outdoor air is maximally utilized, and carbon discharge is reduced.

Figure 2:
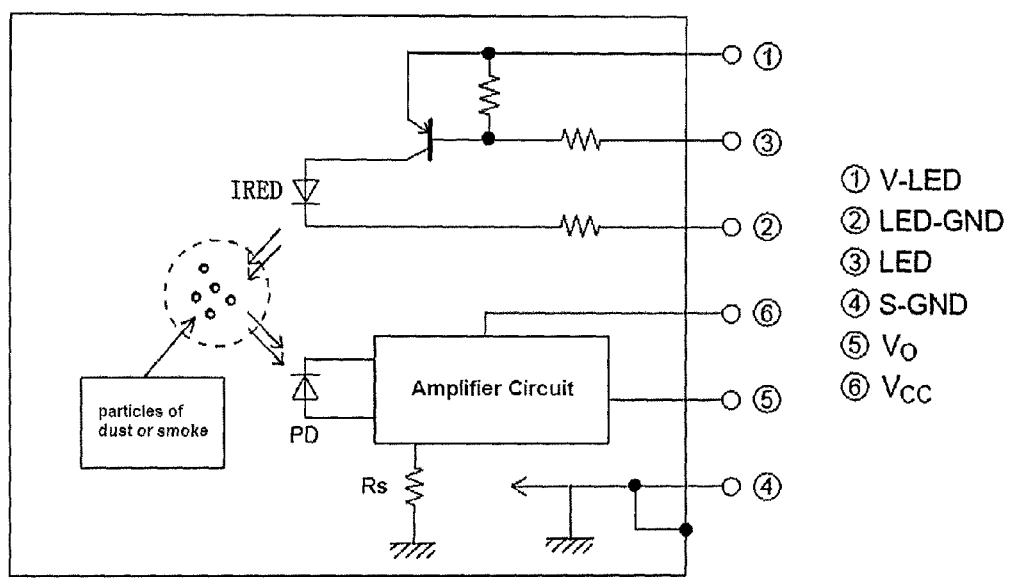
FIG. 2 is a circuit schematic diagram of the dust sensor.
Figure 3A:
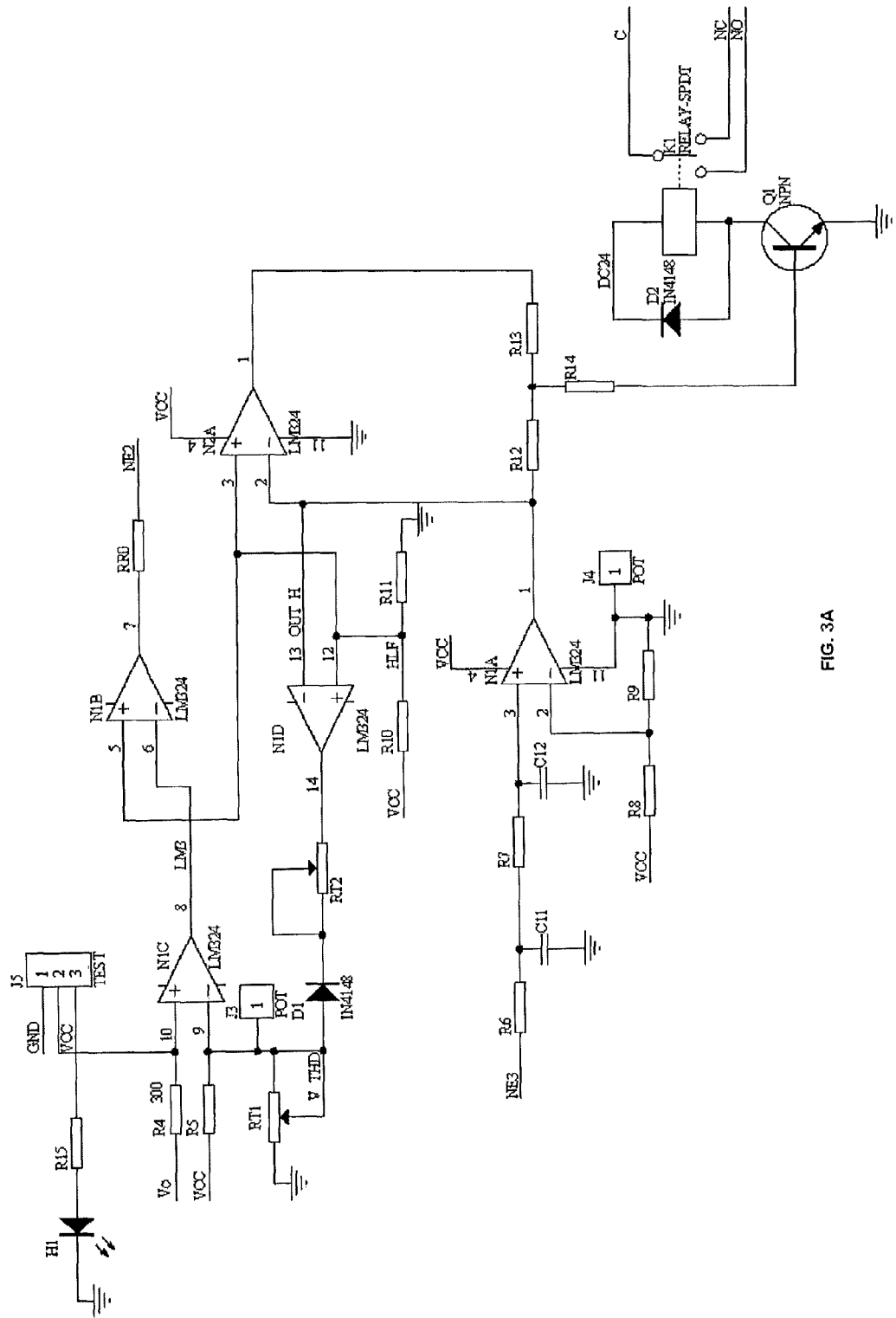
FIG. 3A is a circuit schematic diagram of the main circuit of the air filter protector.
Figure 3B:
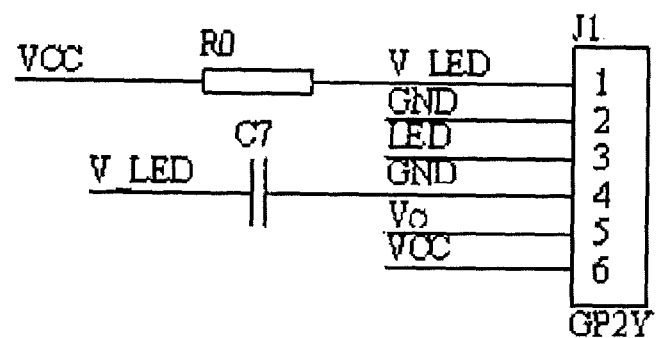
FIG. 3B is a circuit schematic diagram of the interface J1 of the air filter protector.
Figure 3C:
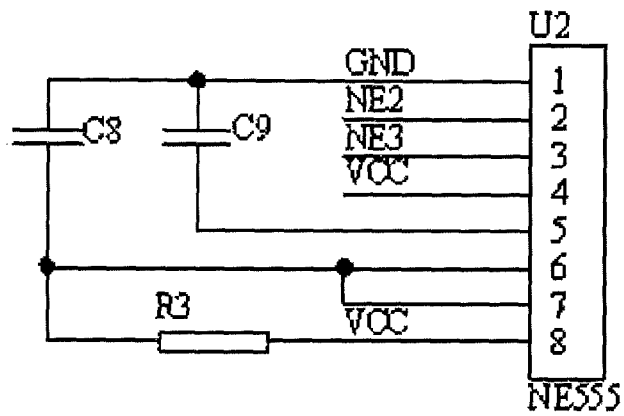
FIG. 3C is a circuit schematic diagram of the pulse generator (U2) of the air filter protector.
Figure 3D:
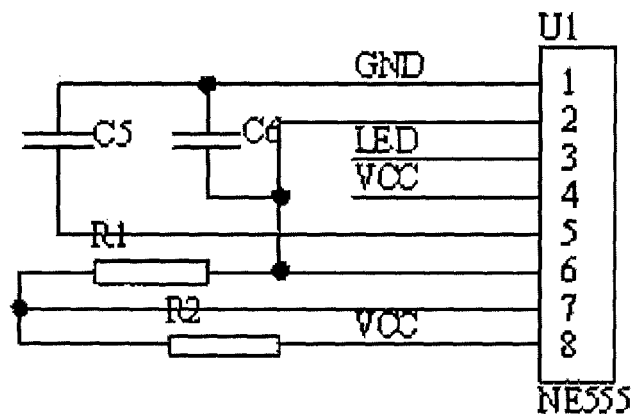
FIG. 3D is a circuit schematic diagram of the trigger unit (U1) of the air filter protector.
Figure 3E:
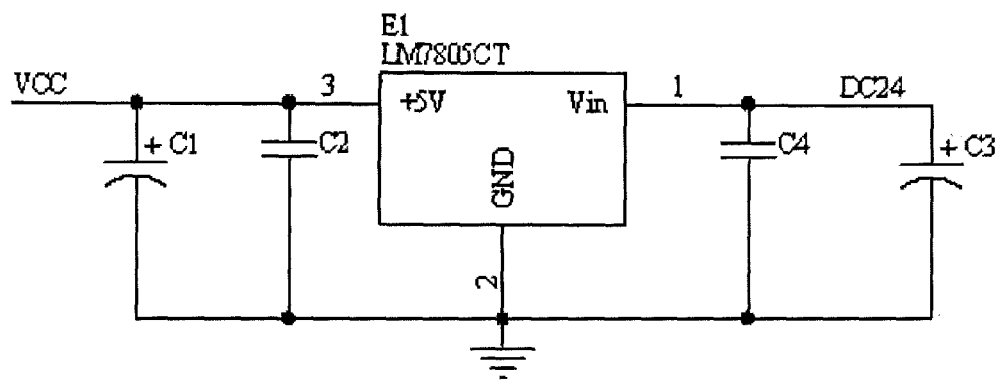
FIG. 3E is a circuit schematic diagram of the power unit (E1).

FIG. 2 is a circuit schematic diagram of the dust sensor 200. An LED light (IRED) and a light detector (PD) are arranged inside the dust sensor 200. Light emitted by the LED light (IRED) converges at one point through a lens, the front end of the light detector (PD) is also provided with a lens, thus the area where optic axes of the two lenses intersect is the detection area of the sensor. When there is dust in the detection area, the light detector (PD) detects reflection light reflected by particles of the dust or smoke, thus outputs a current that is proportional to the detected light intensity, and after being amplified by an amplifier circuit, a high level signal is finally outputted. When no dust is detected, an output current of the light detector (PD) is amplified by the amplifier circuit and a low level signal is finally outputted. In FIG. 2, an LED power supply port 1 (V-LED) receives 5V voltage supply, a switch port 3 (LED) receives a pulse signal stimulus to control turning on and turning off of the LED light (IRED), a dust simulation value output port 5 ($V_O$) is adapted to output the level signal transmitted by the light detector (PD), which represents a particle concentration of dust or smoke, a grounding port 2 and another grounding port 4 are also provided, and a dust sensor power supply port 6 ($V_{CC}$) receives 5V power supply for operation of the amplifier circuit.

FIG. 3A to FIG. 3E illustrate the circuits of the air filter protector 100. The air filter protector 100 is connected to the dust sensor 200 through an interface J1. A power supply port 1 of the interface J1 is coupled to the LED power supply port 1 of the dust sensor 200, grounding port 2 and grounding port 4 of the interface J1 are respectively coupled to the grounding port 2 and the grounding port 4 of the dust sensor 200, a trigger stimulus port 3 of the interface J1 is coupled to the switch port 3 of the dust sensor 200, a signal receiving port 5 is coupled to the dust simulation value output port 5 of the dust sensor 200, and a power supply port 6 is coupled to the dust sensor power supply port 6 of the dust sensor 200.

In detail, the air filter protector 100 includes the following components:

A dust concentration comparator (N1C) with a receiving port 10 coupled to the signal receiving port 5 of the interface J1 and adapted for receiving a level signal which represents a particle concentration of dust or smoke, and with another receiving port 9 adapted for receiving a reference level. The dust concentration comparator (N1C) is adapted for comparing the level signal that is received by the receiving port 10 and represents a particle concentration of dust or smoke with the reference level. If the level signal that represents a particle concentration of dust or smoke surpasses the reference level, then the dust concentration comparator (N1C) outputs a positive pulse signal with a certain cycle period. Otherwise, the dust concentration comparator (N1C) outputs a negative pulse signal A first inverter (NIB) with an input port 6 connected to the dust concentration comparator (N1C), and with another input port 5 coupled to a fixed voltage. The first inverter (N1B) is adapted for inverting the pulse signal outputted by the dust concentration comparator (N1C), so as to output the inverted signal via its voltage output port 7.

A pulse generator (U2) connected to the first inverter (N1B) and adapted for inverting a pulse signal outputted by the first inverter (N1B). The output signal of the first inverter (N1B) is used as a trigger signal for the pulse generator (U2). When the first inverter (N1B) outputs a low level, the pulse generator (U2) generates a positive pulse signal at its output port. When the first inverter (N1B) outputs a high level, there is no pulse signal outputted at the output port of the pulse generator (U2). In this embodiment, the demodulator is embodied by an NE555 chip. A signal receiving port 2 of the NE555 chip receives the pulse signal, and after logical calculus, an output signal is generated at a signal output port 3 thereof. The function of the pulse generator (U2) is to avoid the situation that the relay switch (K1) described below cannot be driven by the dust concentration comparator (N1C) when a negative pulse signal is outputted by the dust concentration comparator (N1C).

If the pulse generator (U2) is not provided, the negative pulse signal outputted by the dust concentration comparator (N1C) is directly transmitted to an input port of the filtering comparator (N1A) described below, and then, since the comparison carried out by the filtering comparator (NIA) might result in a negative pulse, a continuous direct current voltage signal cannot be formed. By adding the pulse generator (U2), the low level or high level pulse output of the first inverter (N1B) is utilized to control the pulse generator (U2) to output a positive pulse signal or to output no pulse signal (0V DC). Therefore, a continuous high voltage can be produced through the filter circuit, thereby ensuring that the output of the filtering comparator (N1A) is a continuous high voltage or low voltage.

A filtering comparator (N1A) with an input port 3 connected to the pulse generator (U2), and with another input port 2 coupled to a fixed voltage. The filtering comparator (N1A) is adapted for carrying out filtering and comparison of the output signal of the demodulator. When the input port 3 receives a pulse input, the filtering comparator (NIA) outputs a high level. When the input port 3 receives no pulse input, the filtering comparator (NIA) outputs a low level.

A second inverter (N1D) with an input port 13 coupled to an output port of the filtering comparator (NIA), with another input port 12 coupled to a fixed voltage, and with an output port coupled to the receiving port 9 of the dust concentration comparator (N1C) through a level adjusting circuit which is adapted for adjusting a value of the reference level.

Wherein, by adjusting the reference level signal, the value of the reference level for the dust concentration comparator (N1C) is adjusted. The value of the reference level substantially corresponds to a standard value of the particle concentration of dust or smoke. For instance, the reference level is normally set at 3V, and when there are people who require a higher quality of air, such as infants or patients, in the room, the detection standard may be raised by setting the reference level signal at 2V.

Furthermore, the level adjusting circuit is also adapted for adjusting the jump range of the value of the reference level. The jump range of the value of the reference level substantially corresponds to a threshold at which the output level of the dust concentration comparator (N1C) jumps between high and low when minor changes happen to the voltage value that represents a particle concentration of dust or smoke. For instance, the reference level is set at 3V, and the voltage output of the dust sensor 200 is 3V±0.1V, then it is possible that the output level of the dust concentration comparator (N1C) jumps frequently. Therefore, by setting a jump range of the value of the reference level, frequent jump of the output level of the dust concentration comparator (N1C) caused by minor changes of the particle concentration of dust or smoke can be effectively avoided. The jump range of the value of the reference level is normally set at ±0.5V.

The level adjusting circuit includes a first resistor (RT1) adapted for adjusting the reference level signal, with a sliding end connected to the reference level receiving end 9 of the dust concentration comparator (N1C) and also coupled to a second resistor (RT2) described below, and with a fixed end connected to ground; a second resistor (RT2) adapted for adjusting the deviation, with a sliding end coupled to the sliding end of the first resistor (RT1) through a diode (D1), and with a fixed end connected to the second inverter (N1D).

The purpose of the above-mentioned design is to ensure that an action can hold within a certain range. If only a single set value is configured (e.g., the reference level signal is set at 3V by the first resistor (RT1)), then frequent jump may occur when the critical point of the set value is reached. By adding the second resistor (RT2), the result is that, once the set value is surpassed, the second inverter (N1D) immediately outputs a low level, and the value of the reference level turns into the recovery voltage value (3V±0.5V) set by the second resistor (RT2). Because this recovery voltage value is higher than the action voltage value, even if the concentration drops a little, the output of the dust concentration comparator (N1C) is ensured to be stable as long as the concentration does not drop below a value corresponding to a voltage value set by the second resistor (RT2).

When the output of the second inverter (N1D) is a low level, the level adjusting circuit determines the reference level signal of the dust concentration comparator (N1C) by adjusting the second resistor (RT2). When the output of the second inverter (N1D) is a high level, the level adjusting circuit determines the reference level signal of the dust concentration comparator (N1C) by adjusting first resistor (RT1), because of the existence of the diode (D1).

A relay switch (K1) coupled to the output port of the filtering comparator (N1A) through a triode transistor (Q1). A base electrode of the triode transistor (Q1) is coupled to the output port of the filtering comparator (N1A), an emitter electrode of the triode transistor (Q1) is connected to ground, and a collector electrode of the triode transistor (Q1) is coupled to a control port of the relay switch (K1). Based on the output signal of the filtering comparator (N1A), the relay switch (K1) selects a normally open position (the port NO and the port C), or a normally closed position (the port NC and the port C). When the filtering comparator (N1A) outputs a high level, the relay switch (K1) closes to generate action. Otherwise, when the filtering comparator (N1A) outputs a low level, the relay switch (K1) opens to stop action.

A trigger unit (U1) connected to the interface (J1) and adapted for transmitting a trigger signal to the dust sensor 200. In this embodiment, the trigger unit (U1) is also embodied by an NE555 chip which is able to transmit a pulse signal to the dust sensor 200 through the interface (J1), so as to trigger the operation of the dust sensor 200.

A power unit (E1) embodied by an LM7805 chip connected to the aforementioned components of the protection device respectively for supplying power to the components.

The working mechanism of the protection device for air filter is as follows:

When the indoor particle concentration of dust or smoke surpasses a standard value, the dust sensor 200 outputs a high level signal. The interface (J1) of the air filter protector 100 receives this high level signal, and the dust concentration comparator (N1C) thereof compares the high level signal with a reference level signal. When the indoor particle concentration of dust or smoke is high, the dust concentration comparator (N1C) outputs a periodical positive pulse signal. The first inverter (N1B) inverts this positive pulse signal, so as to output a negative pulse signal. The logic arithmetic unit (U2) receives this negative pulse signal and then performs logical calculus to output a positive pulse signal. The filtering comparator (N1A) receives this positive pulse signal and then outputs a high level, so that the relay switch (K1) is energized to switch on, thereby generating action.

When the indoor particle concentration of dust or smoke does not surpass a standard value, the dust sensor 200 outputs a low level signal. The dust concentration comparator (N1C) compares this low level signal with a reference level signal, so as to output a periodical negative pulse signal. The first inverter (N1B) inverts this negative pulse signal, so as to output a positive pulse signal. The logic arithmetic unit (U2) receives this positive pulse signal and then performs logical calculus to output no pulse signal. Because the filtering comparator (N1A) does not receive any level signal, it outputs a low level, so that the relay switch (K1) is not energized and switches off, thus the action is stopped.

The above-mentioned embodiments are merely preferred embodiments of the present invention which do not limit the present invention. Therefore, any modification, equivalent substitution and improvement made within the spirit and principle of the present invention are intended to be embraced within the protection scope of the present invention.

The invention claimed is:

1. A protection device for air filter, comprising
a dust sensor; and
an air filter protector, connected with the dust sensor, wherein,
the air filter protector comprises
a dust concentration comparator connected to the dust sensor and adapted for comparing a level signal transmitted by the dust sensor to represent a particle concentration of dust or smoke with a reference level, so as to output a positive or negative pulse signal according to a result of the comparison;
a first inverter connected to the dust concentration comparator;
a pulse generator connected to the first inverter and adapted for inverting a pulse signal outputted by the first inverter;
a filtering comparator connected to the pulse generator and adapted for converting an output of the pulse generator into a high or low level signal;
a relay switch connected to the filtering comparator and adapted for performing on or off action according to the output of the filtering comparator, so as to control opening and closing of an air valve of the air filter,
the air filter protector further comprises a level adjusting circuit connected to the dust concentration comparator and adapted for adjusting a value of the reference level,
the level adjusting circuit comprises
a first resistor with a sliding end connected to a reference level receiving end of the dust concentration comparator and with a fixed end connected to ground;
a second resistor with a sliding end coupled to the sliding end of the first resistor through a diode and with a fixed end coupled to an output end of the filtering comparator through a second inverter.

2. The protection device of claim 1, further comprising a power unit having an LM7805 chip which is connected to the components of the protection device mentioned in any of the foregoing claims respectively for supplying power to said components.

3. The protection device of claim 1, wherein, the dust concentration comparator, the first inverter and the filtering comparator respectively comprises an LM324 chip.

4. The protection device of claim 1, wherein, the pulse generator comprises an NE555 chip.

* * * * *